United States Patent
Harris et al.

(10) Patent No.: US 12,120,279 B2
(45) Date of Patent: Oct. 15, 2024

(54) OUTPUT RESOLUTION SELECTIONS

(71) Applicants: Hewlett-Packard Development Company, L.P., Spring, TX (US); PURDUE RESEARCH FOUNDATION, West Lafayette, IN (US)

(72) Inventors: Todd J. Harris, Boise, ID (US); Peter Bauer, Boise, ID (US); Jan Allebach, West Lafayette, IN (US); Zhenhua Hu, West Lafayette, IN (US); Litao Hu, West Lafayette, IN (US)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/271,725

(22) PCT Filed: Jan. 13, 2021

(86) PCT No.: PCT/US2021/013181
§ 371 (c)(1),
(2) Date: Jul. 11, 2023

(87) PCT Pub. No.: WO2022/154783
PCT Pub. Date: Jul. 21, 2022

(65) Prior Publication Data
US 2024/0073337 A1    Feb. 29, 2024

(51) Int. Cl.
*H04N 1/40* (2006.01)
*G06V 10/44* (2022.01)
(Continued)

(52) U.S. Cl.
CPC .......... *H04N 1/00816* (2013.01); *G06V 10/44* (2022.01); *G06V 10/764* (2022.01); *G06V 10/82* (2022.01); *G06V 30/414* (2022.01)

(58) Field of Classification Search
CPC .. H04N 1/00816; G06V 10/44; G06V 10/764; G06V 10/82; G06V 30/414
See application file for complete search history.

(56) References Cited

U.S. PATENT DOCUMENTS 7,499,588 B2    3/2009  Jacobs et al.
8,380,009 B2    2/2013  Galic
(Continued)

FOREIGN PATENT DOCUMENTS

CN    107240066 A    10/2017

OTHER PUBLICATIONS

"How to enhance the scans of your documents"; Recogniform Technologies, Dec. 2, 2019, pp. 4.
(Continued)

*Primary Examiner* — Dung D Tran
(74) *Attorney, Agent, or Firm* — Brooks, Cameron & Huebsch, PLLC (57) ABSTRACT

In some examples, a computing device can include a processor resource and a non-transitory memory resource storing machine-readable instructions stored thereon that, when executed, cause the processor resource to: identify a plurality of regions within a captured document, determine a quantity of vertical transitions and horizontal transitions within the plurality of regions, and select an output resolution for the plurality of regions based on the quantity of vertical transitions and horizontal transitions within the plurality of regions.

15 Claims, 5 Drawing Sheets

(51) Int. Cl.
    *G06V 10/764*     (2022.01)
    *G06V 10/82*     (2022.01)
    *G06V 30/414*     (2022.01)
    *H04N 1/00*     (2006.01)

(56) References Cited

U.S. PATENT DOCUMENTS

| | | | |
|---|---|---|---|
| 9,973,654 B1* | 5/2018 | Subbaian | H04N 1/4092 |
| 2007/0110322 A1 | 5/2007 | Yuille et al. | |
| 2007/0145148 A1 | 6/2007 | Zhu et al. | |
| 2011/0285874 A1 | 11/2011 | Showering et al. | |
| 2016/0035078 A1 | 2/2016 | Lin et al. | |
| 2016/0163035 A1 | 6/2016 | Chang et al. | |
| 2022/0407978 A1* | 12/2022 | Harris | H04N 1/0408 |

OTHER PUBLICATIONS

Bloomberg, D.S., "Determining the Resolution of Scanned Document Images", Xerox Palo Alto Research Center, Jan. 7, 1999, pp. 14.

\* cited by examiner

OUTPUT RESOLUTION SELECTIONS

BACKGROUND

A computing device can allow a user to utilize computing device operations for work, education, gaming, multimedia, and/or other uses. Computing devices can be utilized in a non-portable setting, such as at a desktop, and/or be portable to allow a user to carry or otherwise bring the computing device along while in a mobile setting. These computing devices can be connected to scanner devices, cameras, and/or other image capture devices to convert physical documents into digital documents for storage.

DETAILED DESCRIPTION

A user may utilize a computing device for various purposes, such as for business and/or recreational use. As used herein, the term "computing device" refers to an electronic system having a processor resource and a memory resource. Examples of computing devices can include, for instance, a laptop computer, a notebook computer, a desktop computer, an all-in-one (AIO) computer, networking device (e.g., router, switch, etc.), and/or a mobile device (e.g., a smart phone, tablet, personal digital assistant, smart glasses, a wrist-worn device such as a smart watch, etc.), among other types of computing devices. As used herein, a mobile device refers to devices that are (or can be) carried and/or worn by a user.

In some examples, the computing device can be communicatively coupled to an image capture device, a printing device, a multi-function printer/scanner device, and/or other peripheral devices. In some examples, the computing device can be communicatively coupled to the image capture device to provide instructions to the image capture device and/or receive data from the image capture device. For example, the image capture device can be a scanner, camera, and/or optical sensor that can perform an image capture operation and/or scan operation on a document to collect digital information related to the document. In this example, the image capture device can send the digital information related to the document to the computing device.

In some examples, the digital information can be data stored on a memory resource of the computing device and/or a remote memory resource to be utilized at a later time. Memory resources to store the digital information can be limited or costly for organizations. In some examples, storing large quantities of digital information can be expensive, especially when relatively large resolutions are utilized. For example, digital information related to documents that were captured using a relatively high resolution can take up more memory resources than digital information related to documents that were captured using a relatively low resolution.

The present disclosure relates to determining an output resolution for a document based on properties of the document. In this way, an output resolution can be selected to preserve the details of the document without using an excessive resolution for the document that would take up or utilize excessive memory resources. For example, the present disclosure relates to calculating edge density for images within the document and classifying portions of text within the document to select an output resolution for the document that will allow the digital information to regenerate the document and utilize a relatively low quantity of memory resources.

Figure 1:
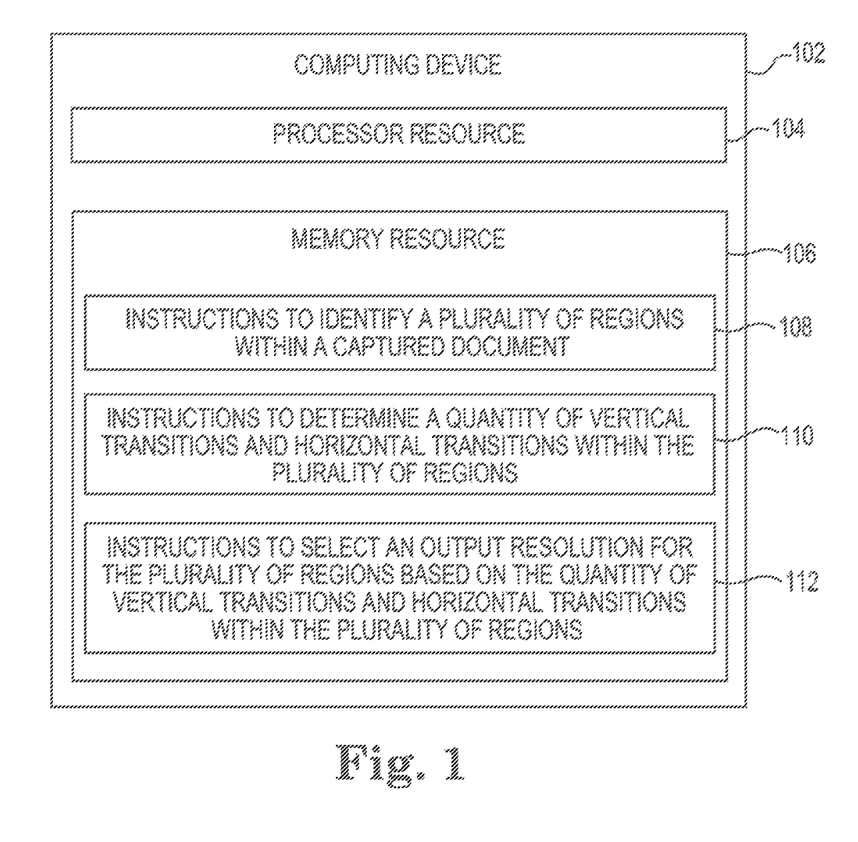
FIG. 1 illustrates an example of a computing device for output resolution selections.

FIG. 1 illustrates an example of a computing device 102 for output resolution selections. In some examples the computing device 102 can include a processor resource 104 communicatively coupled to a memory resource 106. As described further herein, the memory resource 106 can include instructions 108, 110, 112 that can be executed by the processor resource 104 to perform particular functions. In some examples, the computing device 102 can be associated with an image capture device (e.g., camera, scanner, optical sensor, etc.) and/or printing device. As used herein, an image capture device can refer to a device that is capable of digitizing a physical document. For example, the image capture device can convert a physical document to a digital document. In some examples the physical document can include an image on a print medium (e.g., paper, plastic, etc.) and a digital document can include a virtual image from the physical document that can be displayed on a display coupled to the computing device 102.

The computing device 102 can include components such as a processor resource 104. As used herein, the processor resource 104 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 108, 110, 112. In other examples, the computing device 102 can include instructions 108, 110, 112, stored on a machine-readable medium (e.g., memory resource 106, non-transitory computer-readable medium, etc.) and executable by a processor resource 104. In a specific example, the computing device 102 utilizes a non-transitory computer-readable medium storing instructions 108, 110, 112, that, when executed, cause the processor resource 104 to perform corresponding functions.

The computing device 102 can be utilized to dynamically select an output resolution for each portion of a scan job performed by an image capture device. For example, the image capture device can be utilized to capture or scan a plurality of documents. In this example, the computing device 102 can be utilized to select a corresponding resolution for each of the plurality of documents based on corresponding features of the plurality of documents. In previous examples, a resolution may be selected prior to a capture job (e.g., scan job, etc.) and applied to all of the plurality of documents despite the features of the corresponding documents. This can cause issues with a generated virtual document of the capture job. For example, a single resolution selection for the entire capture job can result in a first portion that utilized a resolution that was too high for the properties of the first portion and a second portion that utilized a resolution that was too low for the properties of the second portion. In this example, the first portion can take up unnecessary memory resources and the second portion may not be reproduceable (e.g., have blurry portions, not capable to generate a printed version with similar details as the original document, etc.).

In some examples, the computing device 102 can include instructions that can be executed by a processor resource 104 to identify a plurality of regions within a captured document. In some examples, the computing device 102 can receive image data (e.g., raw image data, etc.) of the captured document. For example, the computing device 102 can receive image data from an image sensor of the image capture device that has not been processed by the image capture device. As used herein, raw image data can refer to pre-processed scan data that is not usable for printing or editing through bitmap graphics editor. In some examples, the image data can be utilized by the computing device 102 to identify the image portion and text portion of the captured document based on pixel concentration, symbol identification, image identification, and/or other identification methods.

In some examples, the computing device 102 can include instructions to determine a mean squared error (MSE) for the identified image portion of the captured document. In some examples, the MSE can be determined by comparing the image portion at a first resolution to the image portion at a second resolution. In some examples, the first resolution can be a relatively high resolution and the second resolution can be a relatively low resolution. For example, the first resolution can be a resolution that is above a resolution threshold and the second resolution can be a resolution that is below the resolution threshold.

In some example, the resolution threshold can be 150 dots per inch (dpi). In these examples, the first resolution can be approximately 300 dpi and the second resolution can be approximately 75 dpi. Although specific resolutions are discussed, the present disclosure is not limited to these resolutions. That is, other resolutions can be utilized without departing from the disclosure.

In some examples, a power spectrum MSE can be calculated based on spectrum changes between the image portion at the first resolution and the image portion at the second resolution. In some examples, a first power spectrum of an input signal corresponding to the image portion at the first resolution can be compared to a second power spectrum of an input signal corresponding to the image portion at the second resolution. As used herein, a power spectrum can refer to a magnitude of an input signal versus frequency. In some examples, the power spectrum can change more intensely between the first resolution and the second resolution compared to the change in input signal between the first resolution and the second resolution.

In some examples, the computing device 102 can include instructions 108 that can be executed by a processor resource 104 to identify a plurality of regions within a captured document. As used herein, the plurality of regions can include portions of the captured document within defined areas. For example, the plurality of regions can include tiles that can be defined by an area. In a specific example, a tile can refer to a size of 224 pixels by 224 pixels. In some examples, the plurality of regions can include windows that can be defined by an area (e.g., area smaller than a tile, etc.). In a specific example, a window can refer to a size of 11 pixels by 11 pixels. In some examples, comparing the image portion at the first resolution and the image portion at the second resolution can include splitting the image portion into a plurality of regions to identify detail loss when the image portion is altered between a relatively high resolution to a relatively low resolution or from a particular resolution to a lower resolution.

In some examples, the plurality of regions can be utilized to identify lines within the image portion that are merging together at particular resolutions. For example, a resolution that is not able to capture detail of the image portion can display a first line merging with a second line to create a "blurry" area between the first line and the second line. In this example, a higher resolution can display the first line distinct and separate from the second line. In this way, the quality of the image can be increased with the higher resolution.

In some examples, the computing device 102 can include instructions 110 that can be executed by a processor resource 104 to determine a quantity of vertical transitions and horizontal transitions within the plurality of regions. In some examples, the plurality of regions can be split along a vertical axis and a horizontal axis. In some examples, the vertical axis can be positioned along a center of the region or a substantial center of the region. In some examples, the horizontal axis can be positioned along a center of the region or a substantial center of the region. In some examples, the horizontal axis can cross the vertical axis at a center point of the region and/or substantially center point of the region. In some examples, the vertical axis can be positioned to interact with a vertical row of pixels within the region and the horizontal axis can be positioned to interact with a horizontal row of pixels within the region.

In some examples, determining the quantity of vertical transitions can include counting a quantity of transitions that are along the vertical axis within the region. As described herein, the vertical axis can be positioned to interact or cross a vertical row of pixels. In these examples, the row of pixels that are interacting with or positioned along the vertical axis are analyzed to determine a quantity of transitions. In some example, the quantity of transitions can be pixels identified as having color or pixels identified as not having color. For example, a run of pixels displaying black can be counted to determine the characteristics of the transitions along the row of vertical pixels to determine the vertical transitions. In a different example, a run of pixels displaying white can be counted to determine the characteristics of the transitions along the row of vertical pixels to determine the vertical transitions. As used herein, a run of pixels can refer to a quantity of pixels that are proximate such that pixels of a different type are not separating the quantity of pixels. For example, a run of foreground pixels can be a plurality or row of foreground pixels that are not separated by a background pixel.

In a similar way, determining the quantity of horizontal transitions can include determining the characteristics of transitions that are along the horizontal axis within the region. As described herein, the horizontal axis can interact with or cross a row of pixels along a horizontal portion of the region. In some examples, the quantity of transitions can be a quantity of pixel runs (e.g., run of pixels, etc.) that are transitions from a particular pixel. For example, the particular pixel can be a white pixel or colorless pixel and the transition pixels can be black or color pixels. In another example, the particular pixel can be a black pixel or color pixel and the transition pixels can be white or colorless pixels. The horizontal and vertical transition pixels can be utilized to calculate edge density.

The same transition pixels can be utilized to determine the quantity of vertical transitions and horizontal transitions (e.g., white or black, etc.) when calculating the edge density. For example, white or colorless vertical transitions and horizontal transitions can be utilized to calculate the edge density in a first example and black or color vertical transitions and horizontal transitions can be utilized to calculate the edge density in a second example. In some examples, the transition count can include a count of a transition from a foreground pixel from a background pixel along an axis. For example, the transition from a background (e.g., print media of the captured document, paper of the captured document, etc.) to a foreground (e.g., deposited printing substance, image on the background, etc.).

In some examples, a quantity of consecutive pixels (e.g., run of pixels, pixel run, etc.) can be determined. As used herein, consecutive pixels refer to pixels that include the same or similar properties that are proximate or touching without different pixels between the pixels with the same or similar properties. For example, a first pixel that is a background pixel can be touching or proximate to a second pixel that is a background pixel. In this example, the first pixel and the second pixel can be consecutive pixels or a run of pixels. In some examples, the consecutive pixels can be determined for pixels along the vertical axis to determine vertical consecutive pixels and determined for pixels along the horizontal axis to determine horizontal consecutive pixels. In some examples, the vertical consecutive pixels are consecutive pixels in a single line along the vertical axis of the tile and the horizontal consecutive pixels are consecutive pixels in a single line along the horizontal axis of the tile.

In some examples, a horizontal density for a particular region can be calculated based on the quantity of transitions along the horizontal axis of the particular region. In some examples, the horizontal density for a particular region can be calculated based on a total quantity of pixels identified along the horizontal axis, a total quantity of consecutive background pixels, and/or a total quantity of consecutive foreground pixels. In addition, a vertical density for the particular region can be calculated based on the quantity of transitions along the vertical axis of the particular region. In these examples, the vertical density for the particular region can be calculated based on a total quantity of pixels identified along the vertical axis, a total quantity of consecutive background pixels, and/or a total quantity of consecutive foreground pixels.

In some examples, the computing device 102 can include instructions 112 that can be executed by a processor resource 104 to select an output resolution for the plurality of regions based on the quantity of vertical transitions and horizontal transitions within the plurality of regions. In some examples, the output resolution for the plurality of regions can be based on the actual quantity of vertical transitions and/or horizontal transition. In addition, the output resolution for the plurality of regions can be based on the vertical density and/or horizontal density that is calculated based on the quantity of vertical transitions and/or horizontal transitions.

In some examples, an output resolution for the plurality of regions and/or the captured document can be selected by utilizing a transition threshold and/or density threshold. For example, the vertical transitions can be compared to a vertical transition threshold, the horizontal transitions can be compared to a horizontal transition threshold, the vertical density can be compared to a vertical density threshold, and/or the horizontal density can be compared to the horizontal density threshold. In some examples, when a quantity of transitions or density exceeds a particular threshold, a corresponding output resolution can be determined to have a particular quality level. In some examples, the particular quality level can be a level of quality that allows a captured document to be reproduced to a quality of the original document captured.

In some examples, the output resolution can be selected based on a determined threshold quantity of vertical transitions and horizontal transitions within the plurality of regions. As described herein, a relatively higher resolution can take more memory resources to store than relatively lower resolutions. Thus, in some examples, the computing device 102 can determine a plurality of output resolutions that exceed a quality threshold for a captured document and select an output resolution that exceeds the quality threshold and is a lowest resolution from a plurality of resolutions that exceeds the quality threshold. In this way, the selected resolution will allow the captured document to reproduce the original document captured.

In some examples, the computing device 102 can determine an edge contrast for the captured document. In some examples, the computing device 102 can convert color images within the captured document to grayscale or to a black and white image. In some examples, the computing device 102 can utilize an edge detector on the grayscale captured document to generate an edge map. As used herein, an edge map can include data that identifies particular locations of image edges within an image. The edge map can be utilized to identify the image contrast utilizing Michelson contrast for regions identified as being part of an edge as identified by the edge map. In some examples, the contrast can be calculated utilizing a minimum and maximum intensity value for the region or identified area. In some examples, the computing device 102 can utilize gradient magnitude metrics of the captured document and/or plurality of regions to calculate or generate the edge maps.

As described herein, a plurality of resolutions for the captured document can be utilized and compared to select one of the plurality of resolutions. With the different resolutions, the edge map for the corresponding resolution can change the image edge map and/or transitions within the plurality of regions. In some examples, differential spatial activity can be utilized to assess image quality for the plurality of resolutions, which can be utilized to determine an output resolution for the scanned document.

In some examples, the computing device 102 can lower an output resolution for a first region when the first region is below the threshold quantity of vertical transitions and horizontal transitions and increase an output resolution for a second region when the second region is above the threshold quantity of vertical transitions and horizontal transitions. In this way, an output resolution can be selected for each of the plurality of regions. In other examples, a single output resolution can be selected for a particular captured document. In these examples, a different output resolution can be selected for each of a plurality of pages based on the vertical transitions and horizontal transitions of the corresponding regions of the plurality of pages. In this way, a first page can have a first output resolution selected and a second page can have a second output resolution that is different than the first scan resolution.

Figure 2:
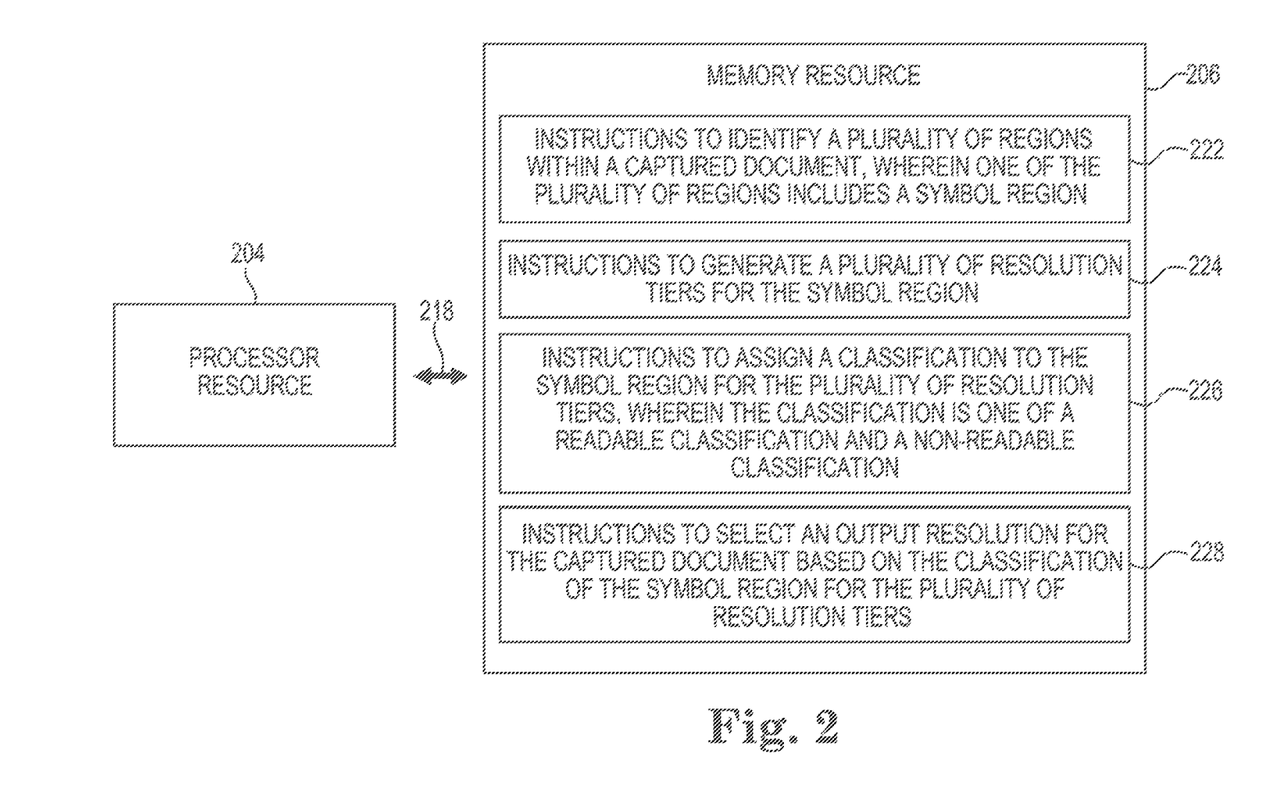
FIG. 2 illustrates an example of a memory resource storing instructions for output resolution selections.

FIG. 2 illustrates an example of a memory resource 206 storing instructions for output resolution selections. In some examples, the memory resource 206 can be a part of a computing device or controller that can be communicatively coupled to a computing system that includes image capture devices. For example, the memory resource 206 can be part of a computing device 102 as referenced in FIG. 1 and communicatively coupled to an image capture device. In some examples, the memory resource 206 can be communicatively coupled to a processor resource 204 that can execute instructions 222, 224, 226, 228 stored on the memory resource 206. For example, the memory resource 206 can be communicatively coupled to the processor resource 204 through a communication path 218. In some examples, a communication path 218 can include a wired or wireless connection that can allow communication between devices and/or components within a single device.

The memory resource 206 may be electronic, magnetic, optical, or other physical storage device that stores executable instructions. Thus, a non-transitory machine readable medium (MRM) (e.g., a memory resource 206) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine readable medium (e.g., a memory resource 206) may be disposed within a controller and/or computing device. In this example, the executable instructions 222, 224, 226, 228 can be "installed" on the device, Additionally, and/or alternatively, the non-transitory machine readable medium (e.g., a memory resource) can be a portable, external or remote storage medium, for example, that allows a computing system to download the instructions 222, 224, 226, 228 from the portable/external/remote storage medium. In this situation, the executable instructions may be part of an "installation package". As described herein, the non-transitory machine readable medium (e.g., a memory resource 206) can be encoded with executable instructions for selecting an output resolution for a particular captured document.

In some examples, the memory resource 206 can include additional instructions to analyze captured documents and determine an output resolution for the captured document to be utilized during post-processing of the captured document. For example, the memory resource 206 can include instructions to receive scanned data (e.g., raw scanned data, pre-processed scan data, etc.) that is captured by an image capture device capturing a document. In some examples, the data can be a result of an initial capture or scan of the document without additional processing performed by the image capture device. In some examples, the image capture device can provide data at a plurality of resolutions for a particular document, such that portions of the data can be compared at the plurality of resolutions.

In some examples, the memory resource 206 can be utilized to identify structural contents within the data and determine a lowest resolution that allows the text to be reproduceable and/or readable. In some examples, the memory resource 206 can include instructions to determine a minimal reproduceable resolution for symbols within the symbol region. In some examples, the structural contents can include symbols that are recognizable to machines or human users. For example, the structural contents can include text, QR codes, lines, and/or handwriting, among other symbols. Examples provided herein can refer to text, however examples are not so limited and can also be utilized with other structural contents. In this way, a quantity of data utilized to store the post-processed image of the captured document can be relatively low while maintaining reproducibility or readability of the structural contents.

In some examples, the processor 204 can split a symbol region into a plurality of sub-regions or smaller regions to perform a convolutional neural network (CNN) calculation on the plurality of sub-regions at a plurality of resolution tiers to predict a resolution that provides readability of the symbol region with a minimized quantity of data for storage. In this way, each page or portion of a captured document can be altered to a particular output resolution to maintain reproducibility and minimize memory storage.

The instructions 222, when executed by a processor resource such as the processor resource 204, can include instructions to identify a plurality of regions within a captured document. In some examples, one of the plurality of regions includes a symbol region. In some examples, the plurality of regions can include a raster region, a vector region, a symbol region, and/or other types of regions that can be identified. As used herein, a raster region can include a portion of the captured document that includes images that comprises a pixel or dot-matrix data structure. As used herein, a vector region can include a portion of the captured document that includes images that comprise points, lines, and curves that are based upon mathematical equations. As used herein, a symbol region can include a portion of the digital image or captured document that includes marks that have a symbolic meaning (e.g., symbols, words, phrases, etc.).

In some examples, the processor resource 204 can execute instructions to split the symbol region into a plurality of sub-regions, additional regions, and/or smaller regions. As described herein, a region or sub-region can include slices, tiles, windows, or defined portions. In some examples, a feature vector can be calculated for each of the plurality of regions of the symbol region. In some examples, the feature vector for a particular region can be a vector that represents multiple features of the region. As used herein, the features of a region can include visual properties of the region. In some examples, the feature vectors of the plurality of regions can be utilized to determine if the symbols within the plurality of regions within the symbol region are classified as readable or non-readable. As described further herein, the plurality of feature vectors for the plurality of regions can be analyzed at a plurality of resolutions or resolution tiers to identify a minimal resolution that produces a readable feature vector for the plurality of regions.

The instructions 224, when executed by a processor resource such as the processor resource 204, can include instructions to generate a plurality of resolution tiers for the symbol region. In some examples, each of the resolution tiers can be based on a designated base resolution. In some examples, the base resolution can be determined based on the features of the image capture device. For example, a particular image capture device can have a maximum resolution that the image capture device is capable of utilizing. In some examples, the maximum resolution for a particular image capture device can be selected as the base resolution (e.g., resolution tier 0). In some examples, a plurality of resolution tiers can be based on the base resolution or resolution tier 0. In some examples, a first resolution tier (e.g., resolution tier 1) can be calculated by dividing resolution tier 0 by 2, a second resolution tier (e.g., resolution tier 2) can be calculated by dividing resolution tier 0 by 4, and a third resolution tier can be calculated by dividing resolution tier 0 by 8. In this example, the resolution tier 0 can be 600 dpi, the resolution tier 1 can be 300 dpi, the resolution tier 2 can be 150 dpi, and the resolution tier 3 can be 75 dpi.

The instructions 226, when executed by a processor resource such as the processor resource 204, can include instructions to assign a classification to the symbol region for the plurality of resolution tiers. In some examples, the classification can be one of a readable classification and a non-readable classification. As described herein, the regions within the symbol region can be analyzed at each of the plurality of resolution tiers to determine whether the region includes readable or non-readable symbols. In some examples, the feature vector of the plurality of regions can be utilized to determine when a corresponding region includes readable or non-readable symbols.

In some examples, the plurality of regions can be analyzed at the base resolution and the CNN calculation can be performed to predict the classification at each of the plurality of tiers. For example, 600 dpi can be utilized to determine the classification for the plurality of regions and a CNN calculation can be performed to predict the classification of the plurality of regions at 300 dpi, 150 dpi, 75 dpi, among other resolution tiers. In this way, a lowest resolution tier with a readable classification can be selected for the plurality of regions and/or for the scanned document.

The instructions 228, when executed by a processor resource such as the processor resource 204, can include instructions to select an output resolution for the captured document based on the classification of the symbol region for the plurality of resolution tiers. As described herein, an output resolution for the captured document can be selected based on whether a particular resolution tier is classified as readable or non-readable. In some examples, an output resolution can be selected from a lowest resolution tier that includes a readable classification. In this way, the captured document can utilize the output resolution for post-processing to generate a captured image that is readable while utilizing a relatively low quantity of memory resources.

In some examples, the processor resource 204 can execute instructions to generate training data to be utilized by the machine learning calculation (e.g., CNN, etc.). In some examples, the captured document can have a relatively large number of pixels (e.g., 6600 by 5100 pixels, etc.). The size of the captured document may be too large to be utilized as inputs for the machine learning calculation and reducing the size of the captured document can alter or distort the resolution of the captured document.

The alteration or distortion can be detrimental to the machine learning calculation since a base resolution (e.g., resolution tier 0, 600 dpi, etc.) can be utilized as a known for the machine learning calculation. Thus, in some examples, the processor resource 204 can split the captured document at the base resolution into a plurality of regions. The plurality of regions can each be smaller than the original size of the scanned document. For example, the plurality of regions can be tiles that have a size of 224 pixels by 224 pixels when the original size of the captured document is 6600 pixels by 5100 pixels.

In some examples, the training data can include a plurality of captured documents that includes different symbols with a plurality of different fonts and/or sizes. The plurality of captured documents can each be split into a plurality of regions such that a plurality of regions are collected at the base resolution. In some examples, the plurality of regions can be individually analyzed to determine a category for the plurality of regions. In some examples, each of the plurality of regions can be analyzed at the base resolution as well as the plurality of additional resolution tiers to identify a category for each of the plurality of regions at each of the plurality of resolution tiers. In some examples, a threshold of readability can be based on the analyzed plurality of regions that can be utilized by the machine learning calculation.

Figure 3:
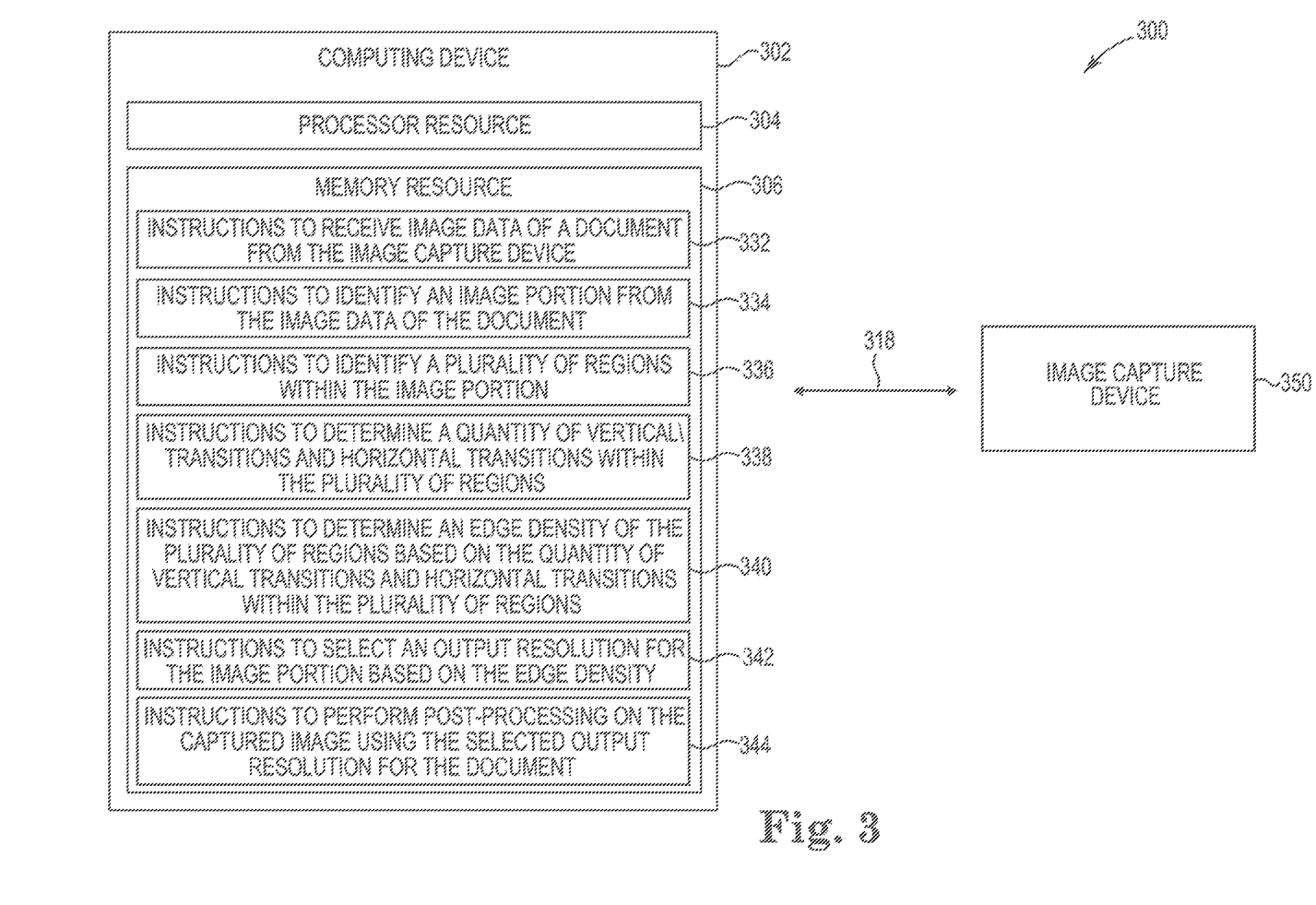
FIG. 3 illustrates an example of a system including a computing device for output resolution selections.

FIG. 3 illustrates an example of a system 300 including a computing device 302 for output resolution selections. In some examples the computing device 302 can be a device that includes a processor resource 304 communicatively coupled to a memory resource 306. As described herein, the memory resource 306 can include or store instructions 332, 334, 336, 338, 340, 342, 344, that can be executed by the processor resource 304 to perform particular functions.

In some examples, the image capture device 350 can be communicatively coupled to the computing device 302 through a communication path 318. In some examples, the computing device 302 can provide instructions to the image capture device 350 to perform particular functions. For example, the computing device 302 can select an output resolution to be utilized by the image capture device 350 or computing device 302 for performing processes for digital data on a particular document. In this way, the computing device 302 can receive image data of a document from the image capture device 350 and the computing device 302 can select an output resolution for the document based on features of the document.

In some examples, the computing device 302 can include instructions 332 that can be executed by a processor resource 304 to receive image data of a document from the image capture device 350. As described herein, the image data of a document can include an initial set of data that is pre-processed data. In some examples, the image data can be generated by the image capture device 350 through an initial job of the document without performing post-processing. In some examples, the image capture device 350 can provide the image data to the computing device 302 through a communication path 318.

In some examples, the image capture device 350 and computing device 302 can be part of the same device. For example, the image capture device 350 can be a portable image capture device that is capable of being transported to a plurality of locations. In other examples, the image capture device 350 and the computing device 302 can be separate and distinct devices such that the image capture device 350 can be located in a first location and the computing device 302 can be located in a second location.

In some examples, the computing device 302 can include instructions 334 that can be executed by a processor resource 304 to identify an image portion from the image data of the document. As described herein, the document that is captured by the image capture device 350 can include portions of text, portions of images, and/or blank portions. In some examples, the image portions can be identified and isolated from non-image portions of the image data of the document. In some examples, the quantity of space occupied by the image portion can be determined. In some examples, the image portion can be utilized to determine a resolution for the document. In other examples, the image portion can be utilized to determine a resolution for the image portion while a different scan resolution is utilized for the non-image portion (e.g., text portion, blank portion, etc.).

In some examples, the computing device 302 can include instructions 336 that can be executed by a processor resource 304 to identify a plurality of regions within the image portion. In some examples, the plurality of regions can be designated rectangles that are of a particular size. In some examples, the plurality of regions can be split from the image data as separate images of the image portion. The plurality of regions can be a defined shape and/or size based on the size of the image portion and/or a quantity of regions to be utilized for a machine learning calculation. In a specific example, the quantity of regions can be sub-images, tiles, and/or windows as described herein.

In some examples, the computing device 302 can include instructions 338 that can be executed by a processor resource 304 to determine a quantity of vertical transitions and horizontal transitions within the plurality of regions. As described herein, the horizontal transitions can be determined by identifying a horizontal axis within each of the plurality of regions and determining a quantity of pixel transitions along the horizontal axis or pixels that interact or intercept the horizontal axis. In some examples, the quantity of transitions can be a quantity of transitions from a background pixel to a foreground pixel that occur along the horizontal axis.

In some examples, the vertical transitions can be determined by identifying a vertical axis within each of the plurality of regions and determining a quantity of pixel transitions along the vertical axis or pixels that interact or intercept the vertical axis. In some examples, the quantity of transitions can be a quantity of transitions from a background pixel to a foreground pixel that occur along the vertical axis. As described herein, the quantity of transitions can indicate a relative blurriness of the image portion of the corresponding region. For example, a relatively higher quantity of transitions can indicate that lines or portions of the image that make up the particular region includes merging of lines and does not include lines that are crisp or distinct.

In some examples, the computing device 302 can include instructions 340 that can be executed by a processor resource 304 to determine an edge density of the plurality of regions based on the quantity of vertical transitions and horizontal transitions within the plurality of regions. In some examples, the edge density can be determined based on an edge detection method to determine outlines of images within the image portion. In some examples, the plurality of regions that make up the determined outlines of the images can be utilized to determine a quantity of merging that is occurring along the edge or outlines of the images within the image portion. In this way, the edge density can be utilized to determine a relative image quality within the image portion.

In some examples, the computing device 302 can include instructions 342 that can be executed by a processor resource 304 to select an output resolution for the image portion based on the edge density. In some examples, the edge density for a plurality of different output resolutions can be utilized to determine an image quality at the outline of images within the image portion. For example, the edge density can be utilized to determine if the outline of an image is relatively crisp or clear. In some examples, an edge density threshold can be utilized to determine when a particular resolution exceeds a quality threshold. For example, the determined edge density for a particular resolution can be compared to the edge density threshold. In this example, a resolution that generates an edge density that is below the edge density threshold can be determined to generate images that are not reproduceable. In this example, a resolution that generates an edge density that is above the edge density threshold can be determined to generate images that are reproduceable.

In some examples, an output resolution can be selected from a plurality of resolutions that generate images that are above the edge density threshold. In some examples, a lowest resolution from the plurality of resolutions can be selected to lower a quantity of memory resources that are occupied when storing the image data. In some examples, the resolution can include a first resolution for the image portion and a second resolution for a text portion of the captured document. In this way, the overall resolution for the captured document can be minimized. As described herein, the output resolution is selected based on a minimal edge density for the image portion that provides a reproduceable image. In some examples, the computing device 302 can perform machine learning to determine the minimal edge density for the image portion that provides a reproduceable image as described further herein.

In some examples, the computing device 302 can include instructions 344 that can be executed by a processor resource 304 to perform post-processing on the captured image using the selected output resolution for the document. In some examples, the selected output resolution can be sent or provided to the image capture device 350 through the communication path 318. In these examples, the image capture device 350 can utilize the selected output resolution to perform post-processing processes to convert the image data to finalized image data. As used herein, the finalized image data can include image data that has been processed by the image capture device 350 to allow viewing and edits of the captured document.

Figure 4:
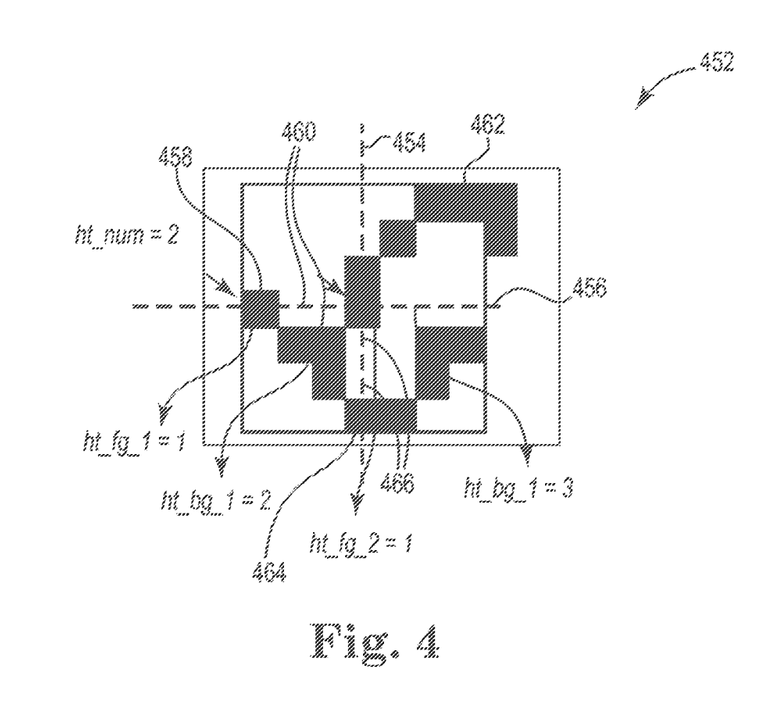
FIG. 4 illustrates an example of an image tile for determining edge density.

FIG. 4 illustrates an example of an image tile 452 for determining edge density. In some examples, the image region 452 can be one of a plurality of image regions that are generated or identified within an image area of a captured document. In some examples, the image region 452 can include a boundary 462. The shape of the boundary 462 is a rectangle, but other shapes are also possible. In some examples, a plurality of pixels can be positioned within the boundary 462. The pixels can be illustrated as black foreground pixels and the pixels can be illustrated as white or blank background pixels.

As described herein, a horizontal axis 456 can be positioned along a set of pixels or cross a set of pixels within the boundary 462 in a horizontal line. In addition, a vertical axis 454 can be positioned along a set of pixels or cross a set of pixels within the boundary 462 in a vertical line. As described herein, the horizontal axis 456 can be utilized to determine a quantity of horizontal transitions and the vertical axis 454 can be utilized to determine a quantity of vertical transitions.

In one example, the horizontal axis 456 can cross one foreground pixel 458 and two background pixels 460 on a first side of the vertical axis 454. In this example, the one foreground pixel 458 and two background pixels 460 on the first side of the vertical axis 454 can be utilized to determine that there is one transition on the first side of the vertical axis 454. That is, there is one transition from the one foreground pixel 458 to the proximate background pixel of the two background pixels 460. In this way, the number of horizontal transitions for the first side of the vertical axis 454 can be one.

In a similar example, the vertical axis 454 can cross one foreground pixel 464 and two background pixels 466 on a first side of the horizontal axis 456. In this example, the one foreground pixel 464 and two background pixels 466 on the first side of the horizontal axis 456 can be utilized to determine that there is one transition on the first side of the horizontal axis 456. That is, there is one transition from the one foreground pixel 464 to the proximate background pixel of the two background pixels 466. In this way, the number of vertical transitions for the first side of the horizontal axis 456 can be one. In some examples, the horizontal transitions and vertical transitions can be determined for each side of the vertical axis 454 and horizontal axis 456 respectively. As described herein, the quantity of horizontal transitions and vertical transitions can be utilized to determine a density of lines or images within the tile 452.

Figure 5:
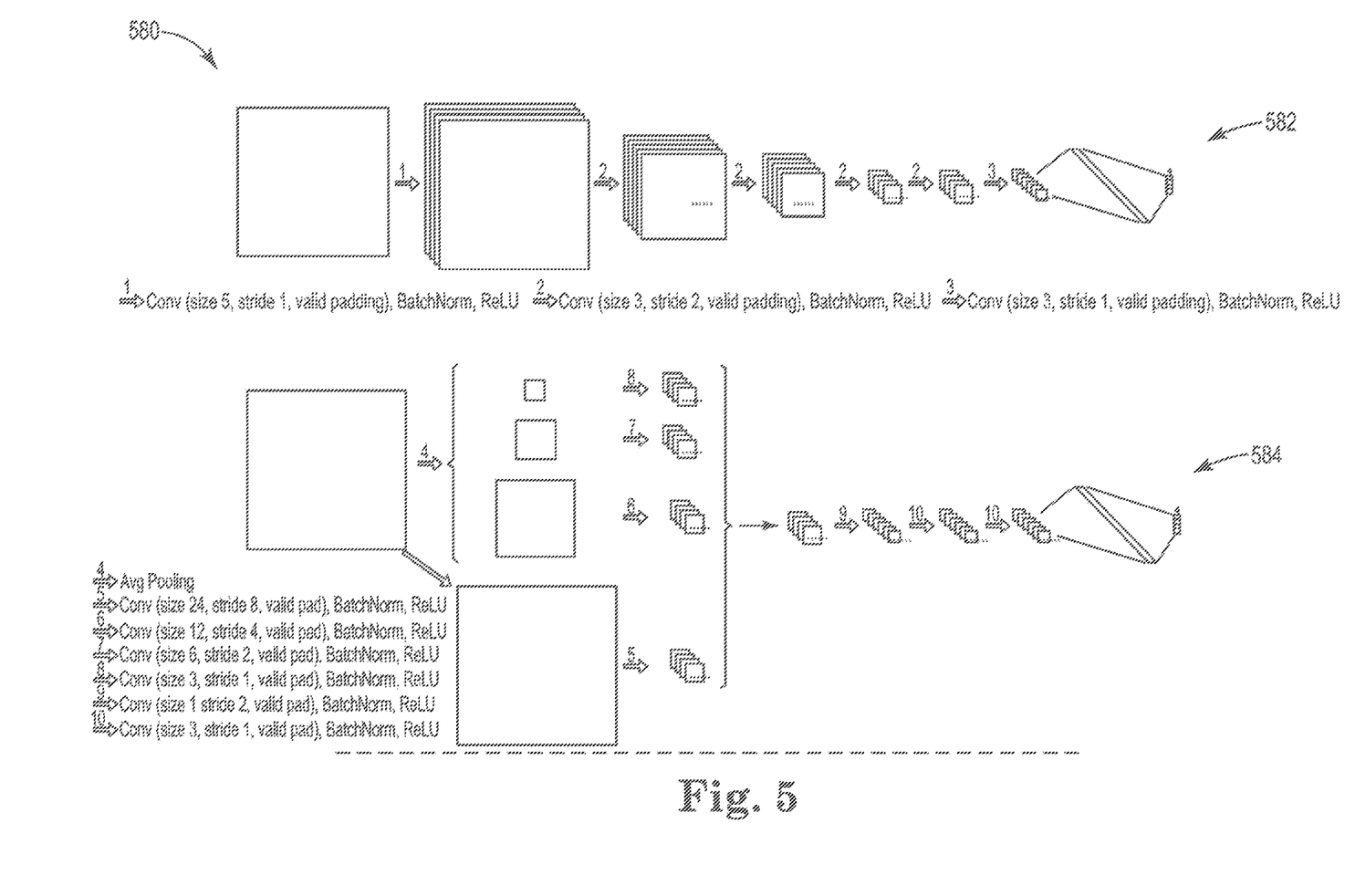
FIG. 5 illustrates an example of a method for selecting a output resolution.

FIG. 5 illustrates an example of a method 580 for selecting an output resolution. In some examples, the method 580 can include a base line model 582 and multi-scale model 584. In some examples, the base line model 582 can include inputting a plurality of regions or tiles that are identified or generated within a symbol portion of a captured document. In some examples, the plurality of inputs or regions can be utilized at a baseline resolution. As described herein, the plurality of regions can be utilized as inputs instead of altering a size of the captured document, which can alter or distort the base resolution.

In some examples, the output of the base line model 582 can be a likelihood of the input image being in each tier of resolutions (e.g., which of four resolution tiers as described herein). The base line model 582 can follow a structure for a classification model such as LeNet. The base line model 582 can consist of six convolutional layers and one linear layer that includes the likelihood of the input image being in each tier of resolutions. The base line model 582 can apply rectified linear unit (ReLU) non-linear activation functions between convolutional layers and a dropout layer before the linear layer. In some examples, the base line model 582 can have added batch normalization after every convolutional layers, in order to make the training process more stable and allow for higher learning rates.

In some examples, the multi-scale model 584 can utilize a plurality of regions at the base resolution tier. In some examples, the input to the multi-scale model 584 can be a single channel fixed size square image. In a specific example, the input sizes can be 224 pixels by 224 pixels. This input size can also be utilized by other models such as MobileNet. In some examples, the multi-scale model 584 can include concatenating the feature maps learned from various scales and use three inverted residual blocks to combine and further extract features. In addition, the multi-scale model 584 can utilize single linear layers as a classifier to classify the learned features from the inverted residual blocks into four classes. In some examples, the output is a vector of size 4 by 1, where each entry represents the likelihood for the input being predicted to the class with the corresponding index (e.g., one of the four scan resolution tiers, etc.). In some examples, the four classes are the four possible archivable/reproduceable resolutions, namely 600 dpi, 300 dpi, 150 dpi, and 75 dpi. In some examples, Softmax nonlinear activation can be utilized along with Cross Entropy Loss during training to increase the accuracy of the multi-scale model 584.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. A computing device, comprising:
a processor resource; and
a non-transitory memory resource storing machine-readable instructions stored thereon that, when executed, cause the processor resource to:
identify a plurality of regions within a captured document;
determine a quantity of vertical transitions and horizontal transitions within the plurality of regions; and
select an output resolution for the plurality of regions based on the quantity of vertical transitions and horizontal transitions within the plurality of regions.

2. The computing device of claim 1, wherein the processor resource is to determine a quantity of transition pixels along a vertical axis to determine the quantity of vertical transitions.

3. The computing device of claim 1, wherein the processor resource is to determine a quantity of transition pixels along a horizontal axis to determine the quantity of horizontal transitions.

4. The computing device of claim 1, wherein the processor resource is to determine an edge density of the captured document based on the quantity of vertical transitions and horizontal transitions within the plurality of regions.

5. The computing device of claim 1, wherein the output resolution is selected based on a determined threshold quantity of vertical transitions and horizontal transitions within the plurality of regions.

6. The computing device of claim 5, wherein the processor resource is to lower an output resolution for a first region when the first region is below the threshold quantity of vertical transitions and horizontal transitions and increase an output resolution for a second region when the second region is above the threshold quantity of vertical transitions and horizontal transitions.

7. The computing device of claim 1, wherein the processor resource is to determine an edge contrast for the plurality of regions base on the quantity of vertical transitions and horizontal transitions within the plurality of regions.

8. A non-transitory memory resource storing machine-readable instructions stored thereon that, when executed, cause a processor resource to:
identify a plurality of regions within a captured document, wherein one of the plurality of regions includes a symbol region;
generate a plurality of resolution tiers for the symbol region;
assign a classification to the symbol region for the plurality of resolution tiers, wherein the classification is one of a readable classification and a non-readable classification; and select an output resolution for the captured document based on the classification of the symbol region for the plurality of resolution tiers.

9. The memory resource of claim 8, wherein the processor resource is to determine a minable reproduceable resolution for symbols within the symbol region.

10. The memory resource of claim 8, wherein the processor resource is to split the symbol region into a plurality of sub-regions to perform a convolutional neural network (CNN) calculation on the plurality of sub-regions at the plurality of resolution tiers.

11. The memory resource of claim 8, wherein the plurality of regions are identified by raw captured data and the selected output resolution is utilized for post-processing of the captured document.

12. A scanning device, comprising:
an image captured device; and
a processor resource to:
receive image data of a document from the image capture device;
identify an image portion from the image data of the document;
identify a plurality of regions within the image portion;
determine a quantity of vertical transitions and horizontal transitions within the plurality of regions;
determine an edge density of the plurality of regions based on the quantity of vertical transitions and horizontal transitions within the plurality of regions;
select an output resolution for the image portion based on the edge density; and
perform post-processing on the captured image using the selected output resolution for the document.

13. The scanning device of claim 12, wherein the output resolution includes a first output resolution for the image portion and a second output resolution for a text portion of the captured document.

14. The scanning device of claim 12, wherein the output resolution is selected based on a minimal edge density for the image portion.

15. The scanning device of claim 14, wherein the processor resource is to perform machine learning to determine the minimal edge density for the image portion.

* * * * *